United States Patent Office 3,574,097
Patented Apr. 6, 1971

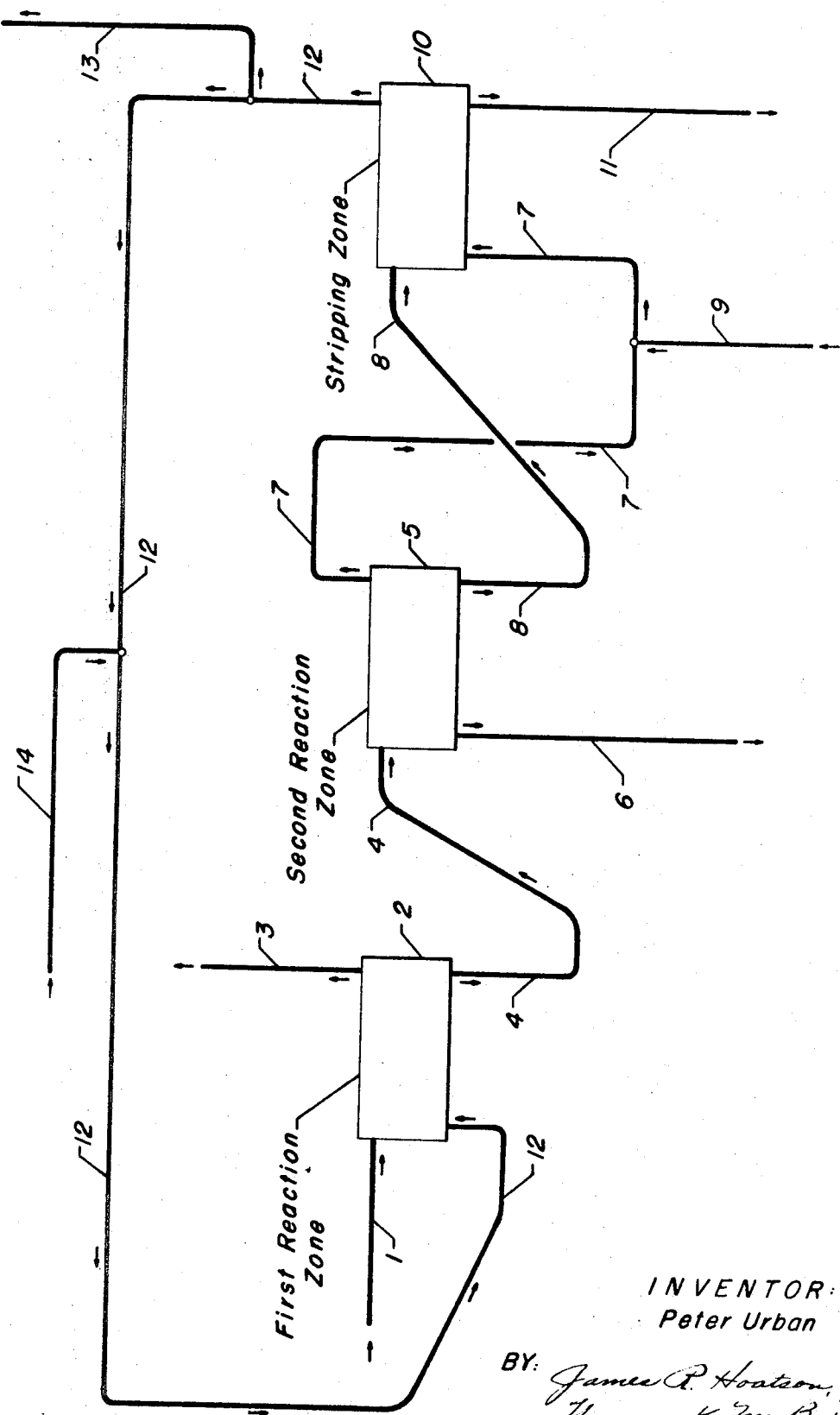

3,574,097
TREATING A WATER STREAM CONTAINING A WATER-SOLUBLE SULFITE COMPOUND
Peter Urban, Northbrook, Ill., assignor to Universal Oil Products Company, Des Plaines, Ill.
Filed Feb. 9, 1970, Ser. No. 9,894
Int. Cl. C02b 1/18
U.S. Cl. 210—61
21 Claims

ABSTRACT OF THE DISCLOSURE

A water stream containing a water-soluble sulfite compound is treated in order to reduce its total sulfur content while minimizing the formation of sulfate by-products by the steps of: (a) converting the sulfite compound contained in the water stream to the corresponding thiosulfate compound; (b) reacting the resulting thiosulfate compound with carbon monoxide at reduction conditions selected to produce the corresponding sulfide compound; and thereafter (c) stripping hydrogen sulfide from the effluent stream from step (b) to form a substantially sulfate-free treated water stream which is substantially reduced in total sulfur content relative to the input water stream. Principal utility of this treatment procedure is associated with the regeneration of a sulfite-containing absorbent stream which is commonly produced by contacting a flue gas stream containing sulfur dioxide with a suitable aqueous absorbent stream containing an alkaline reagent. The treated water stream produced by the present method can then be reused in the absorption process or discharged into a suitable sewer without causing pollution problems. Key features of this method involves the selective conversion of the sulfite compound to the corresponding thiosulfate compound, the subsequent reduction of the thiosulfate compound to the corresponding sulfide compound in a highly efficient, economic and selective manner, and the minimization of undesired sulfate by-products during both of these conversion steps.

---

The subject of the present invention is a three-step method for the selective treatment of an aqueous stream containing a water-soluble sulfite compound in order to reduce its total sulfur content (i.e. the total amount of sulfur contained therein in any form, expressed on an elemental sulfur basis) to the point where it can be re-used in the process which produced it, or alternatively it can be safely discharged into a suitable sewer without causing a major pollution problem. More precisely, the present invention involves a novel three-step method for treating a sulfite-containing water stream wherein the first step involves conversion of the sulfite compound to the corresponding thiosulfate compound, the second step relates to the reduction of the resulting thiosulfate compound to form the corresponding sulfide compound and the final step involves the stripping of hydrogen sulfide from the solution produced in the second step to form the treated water stream. In one important aspect, the present invention concerns the treatment of an aqueous stream containing ammonium sulfite to produce hydrogen sulfide and a treated aqueous stream having a greatly reduced total sulfur content and which is substantially free of ammonium sulfate. In another important aspect, the present invention relates to the treatment of a rich absorbent stream, which is produced by scrubbing a gas stream containing sulfur dioxide with an aqueous solution containing a suitable alkaline reagent, in order to regenerate the absorbent stream so that it can be reused to absorb additional quantities of sulfur dioxide.

A major problem encountered in many areas of industry today is associated with the production of waste gas streams containing sulfur dioxide. The problem essentially involves the disposal of these waste gas streams without causing substantial air pollution. This problem is an extremely complex one because of the wide variety of industrial sources that emit these sulfur dioxide-containing gas streams. One of the more common sources is associated with the combustion of sulfur-containing fuels in boilers, internal combustion engines, heating units, etc. to produce flue or stack gas streams containing sulfur dioxide. Similarly, waste gas streams of this type are generally produced by other industrial processes such as the smelting of sulfur-bearing ores, the refining of sulfur-containing crude oils, the synthesis of sulfuric acid, the sulfonation of hydrocarbons, the production of coke, the production of sulfur in a Claus process, the production of paper via a wood pulping process and the like industrial processes. It is well known that the indiscriminate discharge of these gas streams into the atmosphere results in a substantial air pollution problem because the sulfur dioxide has extremely detrimental effects on animal and plant life. In addition, the discharge of these gas streams into the atmosphere constitutes a waste of a valuable material because the sulfur contained in same is an industrial commodity. Many processes have been proposed for removal of sulfur dioxide from these gas streams. A large percentage of these proposed removal procedures involve contacting the sulfur dioxide containing gas stream with an aqueous absorbent stream which typically contain materials which chemically or physically react with the sulfur dioxide in order to absorb same into the liquid solution. A common procedure involves the use of a solution of an alkaline reagent such as ammonium hydroxide, sodium hydroxide, sodium carbonate, ammonium carbonate, and the like alkaline reagents, to produce a rich absorbent stream containing the corresponding sulfite compound. Likewise, similar aqueous solution containing salts of sulfurous acid are produced in many areas of modern industry such as in the chemical, petrochemical, pharmaceutical, steel, paper, food, fertilizer, petroleum and the like industries.

Because these water streams contain a sulfite compounds, their discharge into a waste water sewer can cause substantial, well-known water pollution problems including excessive biological oxygen demand, poisoning of marine and plant life and the like. Regardless of the source of these aqueous sulfite-containing streams, it is clear that there is a substantial need for a simple and effective method for treating them in order to allow their reuse in the processes which produced them as their safe discharge into a suitable sewer. In the case where the treated water stream is to be recycled to the process which produced the input water stream, it is generally required that the treated water streams be substantially free of sulfate compounds. The reason for this requirement is that these compounds, once formed, are very intractable and in a closed system tend to build up in the recycle water stream until finely divided solids are formed. These solids then can precipitate in the form of a scale or sludge which can foul the internals of the equipment using this recycle stream. For instance, when the treated stream is recycled to a gas scrubbing process, these sulfate compounds can cause severe corrosion and erosion difficulties in the scrubbing equipment, plus they can foul the internals of the scrubbing means. When a drag stream is withdrawn from the process and discarded or treated by a method such as crystallization, evaporation, filtration, etc., to remove these sulfate compounds, valuable alkaline reagent is typically lost from the system. Moreover, the yield of sulfur recovered during the water treatment operation is detrimentally affected by these sulfate by-products.

One solution that has been proposed to the problem of treating these sulfite-containing water streams is the use of a suitable reducing agent to react with the sulfite compounds contained therein to make elemental sulfur and/or the corresponding sulfide compound. However, despite stringent precautions, when common reducing agents such as hydrogen, a suitable sulfide compound, or carbon monoxide are used in an attempt to directly reduce these sulfite compounds to elemental sulfur or the corresponding sulfide compounds, undesired sulfate compounds are formed in unacceptable amounts. These sulfate compounds are believed to be caused by the sulfite compounds undergoing auto-oxidation reduction at the conditions necessary for direct reduction.

The problems addressed by the present invention is, therefore, to provide a procedure for treating these sulfite-containing water streams to enable the recovery of hydrogen sulfide therefrom in a highly selective manner, to produce a treated aqueous stream of greatly reduced total sulfur content and to minimize the amount of undesied sulfate by-products.

I have now found a method for treating an input water stream containing a water-soluble sulfite compound which enables the recovery of hydrogen sulfide in high yields, minimizes the formation of undesired sulfate by-products and produces a treated water stream which is of relatively low total sulfur content and contains substantial amounts of an alkaline carbonate salt and which is suitable for direct recycling to the scrubbing process which produced the original input water stream. The concept of the present invention is based on my finding that the sulfite compound contained in this input water stream can be easily converted at relatively low severity conditions to the corresponding thiosulfate compound in a highly selective manner without forming any substantive amounts of undesired, intractable sulfate compounds. Coupled with this finding is my additional observation that the thiosulfate compound can be reduced in a highly selective, economic and efficient manner by carbon monoxide to form the corresponding sulfide compound from which hydrogen sulfide can be easily recovered. Thus the central point of the instant method involves using the thiosulfate as an intermediate in a multi-step procedure to reduce a sulfite compound to hydrogen sulfide, rather than an attempt to directly reduce the sulfite compound to sulfide in a one step procedure. This sulfite to thiosulfate to sulfide route provides a procedure which facilitates careful control of by-products formation during the treatment procedure and enables the recovery of a treated water stream which can be recycled to a sulfur dioxide scrubbing operation.

It is, accordingly, an object of the present invention to provide a simple, effective, efficient and selective method for treating a sulfite-containing water stream to produce hydrogen sulfide and a treated water stream of greatly reduced total sulfur content while minimizing the formation of undesired, refractory sulfate by-products.

In brief summary, the present invention is, in one broad embodiment, a method for treating an input water stream containing a water-soluble sulfite compound in order to reduce its total sulfur content while minimizing the formation of undesired sulfate by-products. In the first step of the method, the sulfite-containing water stream is contacted with a reducing agent selected from the group consisting of finely divided sulfur, a polysulfide compound, a water-soluble sulfide compound and mixtures thereof, at thiosulfate production conditions selected to form a thiosulfate-containing effluent stream. Thereafter, the effluent stream from the first step is reacted, in the second step, with carbon monoxide at reduction conditions selected to result in an effluent stream containing the corresponding sulfide compound. In the final step, hydrogen sulfide is stripped from the effluent stream recovered from the second step to form a substantial sulfate-free treated water stream which is substantially reduced in total sulfur content relative to the input water stream.

In a more specific embodiment, the present invention is a method for treating an input water stream containing ammonium sulfite in order to reduce its total sulfur content while minimizing the formation of ammonium sulfate. The first step here involves contacting the input water stream with hydrogen sulfide at thiosulfate production conditions selected to form an effluent stream containing ammonium thiosulafte. In the second step, the effluent stream from the first step is reacted with carbon monoxide at reduction conditions selected to produce an effluent stream containing ammonium hydrosulfide. Following this last step, the effluent stream therefrom is stripped with a gas stream containing carbon dioxide at conditions selected to form a hydrogen sulfide-containing overhead stream and a treated water stream containing ammonium carbonate, which water stream is substantially reduced at total sulfur content relative to the input water stream and is substantially free of ammonium sulfate. A portion of the overhead stream from the stripping step is then, in the final step, passed to the first step in order to supply hydrogen sulfide reactant thereto.

In another embodiment, the present invention comprises a method as described above wherein the second step is performed in the presence of a catalyst comprising a metallic sulfide selected from the group consisting of cobalt, molybdenum and tungsten sulfide, combined with an activated carbon carrier material.

Other objects and embodiments of the present invention are hereinafter disclosed in the following discussions of the input streams, the preferred conditions, the output streams, preferred reactants and mechanics associated with each of the essential and preferred steps of the present invention.

As indicated above, the first step of the present method involves the conversion, in a highly selective manner, of the sulfite compound contained in the input water stream to the corresponding thiosulfate compound. The sulfite compound contained in this input water stream is generally characterized as water-soluble. Examples of water-soluble sulfite compounds are sulfite salts of relatively strong bases such as ammonium sulfite, the alkali metal sulfites and the alkaline earth sulfites. In addition to the normal sulfite salts, it is intended to include the bisulfite salts of the relatively strong bases. Especially suitable alkali metal sulfite compound are sodium sulfite and potassium sulfite. Likewise, suitable alkaline earth sulfites are exemplified by magnesium sulfite. The preferred sulfite compound for purposes of the present invention is ammonium sulfite. Ordinarily, the sulfite compound will be present in this input aqueous solution in an amount ranging from about 0.01 wt. percent up to the solubility limit of the particular sulfite compound in water at the conditions utilized in this first step. Particularly good results are obtained when the input water stream contains about 1 to about 25 wt. percent of the sulfite compound. It is to be noted that in many cases the aqueous input stream to this step will contain a mixture of a normal sulfite salt and a bisulfite salt such as a mixture of $(NH_4)_2SO_3$ and $NH_4HSO_3$.

The reducing agent utilized in this first step is selected from the group consisting of finely divided sulfur, a polysulfide compound, a water-soluble sulfide compound and mixtures thereof. In the first mode of operation of this step, finely divided sulfur is utilized as the reducing agent, and it is preferred that the sulfur be present in particle size of about 10 to about 250 microns, with best results obtained with particles of about 25 to about 100 microns. Typically, it is a good practice to introduce the sulfur into this step via a water stream containing a slurry of finely divided sulfur in an amount of about 1 to about 75 wt. percent thereof, although many other suitable means for injecting finely divided solid particles can be utilized if desired. In this first mode of operation, it is preferred to also utilize a wetting agent in the reaction mixture in order to facilitate good contact of the elemental sulfur with the sulfite compound. Suitable wetting agents are: the salts of alkyl aryl sulfonates such as the sodium salt of dodecylbenzene sulfonate; sulfonated fatty acid esters; $C_{12}$ to $C_{16}$ alkyl sulfates; $C_{12}$ to $C_{16}$ alkyl sulfonates; alkyl polyoxyethylene alcohols; ethylene oxide condensation products of alkyl phenols; quaternary ammonium salts such as octadecyldimetiylbenzyl ammonium chloride and the like wetting agents. The wetting agent is preferably utilized in a relatively small amount corresponding to about 0.01 to about 1 wt. percent of the sulfite compound that is reacted. The amount of elemental sulfur utilized in this first mode of operation of the first step should be sufficient to supply one atom of sulfur per molecule of sulfite compound contained in the input water stream, with the preferred amount corresponding to about 1 to about 3 atoms of sulfur per mole of sulfite compound.

In a second mode of operation for this first step, the reducing agent is a polysulfide compound. Suitable polysulfide compounds include the ammonium, alkali metal, and alkaline earth polysulfides. Best results are ordinarily obtained with ammonium polysulfide. The polysulfide compound is ordinarily charged to this first step in the form of an aqueous solution containing about 1 to about 50 wt. percent of the polysulfide compound. It is to be noted that when the reducing agent is a polysulfide compound, no wetting agent is necessary in order to achieve good contact with the sulfite compound. The amount of the polysulfide compound charged to this step is preferably sufficient to provide at least the stoichiometric amount necessary for the reaction between it and the sulfite compound to produce the corresponding thiosulfate compound. In the typical case where the polysulfite compound contains four atoms of elemental sulfur and one atom of sulfide (e.g. $(NH_4)_2S_5$), the stoichiometric amount is ⅙ moles of polysulfide per mole of sulfite compound, with a preferred value being about ¼ to about ¾ or more moles of polysulfide per mole of sulfite compound.

In a third mode of operation of this first step, the reducing agent is a water-soluble sulfide compound. Suitable water-soluble sulfide compounds are hydrogen sulfide, ammonium sulfide, ammonium hydrosulfide and the sulfides and hydrosulfides salts of the alkali and alkaline earth metals. Best results are ordinarily obtained in this mode of operation of this step when the sulfide reactant is hydrogen sulfide or ammonium hydrosulfide. The amount of this sulfide reactant utilized in this step is at least sufficient to provide 0.5 moles of sulfide compound per mole of sulfite compound contained in the input water stream, with best results obtained at a mole ratio corresponding to about 0.6 to about 1.5 or more. Likewise, in this third mode of operation, good results are ordinarily obtained when the pH of the input water stream is in the range of 4 to about 7.

Conditions utilized in this first step can be generally described as thiosulfate production conditions and comprise: a temperature of about 20 to about 150° C., a pressure sufficient to maintain the input water stream in the liquid phase and a contact time corresponding to about 0.05 to 1 or more hours. In general, the contact time necessary for the desired reaction is a function of the reducing agent utilized, with relatively short contact times of about 1 to 5 minutes being sufficient in the case where the reducing agent is a polysulfide compound. The other two reducing agents require a relatively longer contact time ranging up to about 0.5 to about 1 hour. Considering all of the factors involved in the operation of this first step, best results are ordinarily obtained when the reducing agent is hydrogen sulfide or a polysulfide compound, particularly ammonium polysulfide.

Following this first step, an aqueous effluent stream containing relatively large amounts of a thiosulfate compound is withdrawn therefrom and passed to the second step of the present method wherein it is reacted with carbon monoxide at reduction conditions selected to produce the corresponding sulfide compounds.

The carbon monoxide for use herein may be obtained from any suitable source or may be prepared in any suitable manner. An acceptable carbon monoxide stream is obtained by the partial oxidation of organic materials, and particularly carbon at high temperature with oxygen, air or steam. Likewise, a carbon monoxide stream suitable for use herein can be prepared by the reduction of carbon dioxide by hydrogen, carbon or certain metals at high temperatures. For example, a gas stream containing about 40% carbon monoxide is easily prepared by blowing steam through a bed of coal at an elevated temperature. Another suitable carbon monoxide-containing stream is obtained by simultaneously blowing air and steam through a bed of red hot coal to produce a gas stream containing about 30% carbon monoxide. In addition, blast furnace gases resulting from the reduction of iron oxide by red hot coke can be utilized to supply the necessary carbon monoxide stream if desired. Yet another source of a suitable carbon monoxide stream is a stream prepared by passing carbon dioxide and oxygen through charcoal or coke at a temperature greater than about 1,000° C. in order to decompose the $CO_2$ to CO. Regardless of the source of the carbon monoxide, it is preferably used herein in an amount sufficient to provide a mole ratio of carbon monoxide to thiosulfate compound of at least 4:1 with best results obtained at a mole ratio of about 5:1 to 10:1 or more. I have observed that the amount of sulfide formed increases with higher mole ratios of carbon monoxide to thiosulfate.

This second step can be carried out, if desired, without the use of a catalyst; however, in many cases it is advantageous to use a catalyst for this reaction. Based on my investigations I have determined that improved results are obtained in this second step when the reaction zone contains materials such as particles of charcoal, and particles of activated carbon. Particularly good results are obtained with a catalyst comprising a metallic component selected from the group consisting of the transition metals of group VI and VIII such as chromium, molybdenum, tungsten, iron, cobalt, nickel, platinum, palladium, etc. From this, I have concluded that preferred catalysts for the desired reduction reaction comprise a combination of a Group VI or a Group VIII transition metal component with a suitable porous support such as alumina or activated carbon. Particularly preferred embodiments of the present method involve the use of catalysts in which the metallic component is present in the form of a metallic sulfide such as cobalt sulfide, or molybdenum sulfide, or tungsten sulfide combined with a carrier material. The preferred carrier materials are activated carbons such as those commercially available under the trade names of Norite, Nucher, Darco and other similar products. In addition, other conventional natural or synthetic highly porous inorganic carrier materials may be used as the support for the metallic component such as alumina, silica, silica-alumina, etc. Best results are ordinarily obtained with a catalyst comprising cobalt or molybdenum or tungsten sulfide combined with relatively small particles of activated carbon. Excellent results have been obtained with 10 to 12 mesh activated carbon particles containing about 5 wt. percent of cobalt sulfide. In general, the amount of the metallic component utilized in the catalyst should be sufficient to comprise about 0.1 to about 50% thereof, calculated on a metallic sulfide basis. These catalysts can be prepared according to any of the conventional procedures for combining a metallic component with a carrier material, with an impregnation procedure with a soluble, decomposable compound of the desired Group VI or VIII metal ordinarily giving best results.

This second step can be carried out in a conventional reaction zone in any suitable manner. The thiosulfate-containing effluent stream from the first step can be passed into the reaction zone in either upward, radial or downward flow and the carbon monoxide stream can be simultaneously introduced into the reaction zone in either countercurrent or concurrent flow relative to the thiosulfate-containing effluent stream. In particular, a preferred embodiment of this second step involves downward flow of the thiosulfate stream with countercurrent flow of the carbon monoxide stream. It is preferred to utilize suitable means in the reaction zone for effecting intimate contact between a liquid stream and a gas stream. Suitable contacting means include bubble trays, baffles and any of the various packing materials known to those skilled in the art. In the preferred case where a catalyst is utilized in this second step, best results are ordinarily obtained when the catalyst is maintained within the reaction zone as a fixed bed of relatively small particles. These catalyst particles perform the dual functions of catalyzing the desired reaction and of promoting intimate contact between the gas and liquid streams. In the preferred countercurrent flow mode of operation for this step, a gas stream containing carbon dioxide, unreacted carbon monoxide and some hydrogen sulfide is withdrawn from the upper region of the reaction zone. Likewise, an aqueous effluent stream containing the corresponding sulfide compound is withdrawn from the lower region of the reaction zone. For example, in the case where the input stream to this second step contains ammonium thiosulfate, this aqueous effluent stream will primarily contain ammonium hydrosulfide with minor amounts of unreacted ammonium thiosulfate, ammonium carbonate and ammonium hydroxide.

The reduction conditions utilized in this second step are typically relatively more severe than those utilized in the first step and can be generally characterized as reduction conditions sufficient to effect conversion of thiosulfate to sulfide. The temperature is preferably selected from the range of about 125 to about 350° C., with best results obtained at a relatively high temperature of about 175 to about 350° C. It is an essential feature of the present invention, that the second step be conducted under liquid phase conditions; accordingly, the pressure employed must be sufficient to maintain at least a portion of the effluent stream from the first step in the liquid phase. Typically the pressure is selected from the range of about 100 to about 3,000 p.s.i.g., as a function of the reaction temperature in order to maintain the desired liquid phase condition. Particularly good results are obtained at a temperature of about 200° C., and a pressure of about 500 p.s.i.g. It is preferred to use a liquid hourly space velocity (defined on the basis of the liquid volume charge rate of the effluent stream from the first step divided by the volume of the reaction zone utilized in this second step in the case where a catalyst is not utilized and by the volume of the catalyst bed in the case where a catalyst is used in this second step) selected from the range of about 0.25 to about 10 hrs.$^{-1}$, with best results obtained at about 0.5 to about 3 hrs.$^{-1}$. Excellent results have been obtained in this second step with a LHSV of 1 hrs.$^{-1}$.

In the final step of the present invention the aqueous effluent stream recovered from the thiosulfate reduction step is subjected to a stripping step designed to liberate hydrogen sulfide therefrom. Although any suitable stripping gas can be utilized including steam, nitrogen, air and the like, carbon dioxide is particularly preferred, because it acts to decrease the pH of the solution and form the corresponding carbonate salt. For instance in the case where the effluent stream from the second step contains ammonium hydrosulfide, stripping with carbon dioxide liberates hydrogen sulfide and produces ammonium carbonate. In another mode of operation of this step, the effluent water stream from the thiosulfate reduction step can be subjected to conditions sufficient to decompose the sulfide compound contained in this stream. For example, in the typical case where this water stream contains ammonium hydrosulfide, acceptable decomposition conditions are a temperature of about 100 to 200° C., and a pressure of about 1 to about 75 p.s.i.g. Typically this decomposition mode of operation is contacted in a conversion distillation zone wherein upflowing vapors are generated by supplying heat to the bottom of same by means such as a steam coil or conventional reboiler. Regradless of which mode of operation is employed in this third step, an overhead stream containing hydrogen sulfide will be produced. Likewise, a treated water stream which is substantially reduced in total sulfur content and is substantially sulfate-free will be recovered therefrom.

As indicated, this treated water stream is substantially reduced in total sulfur content relative to the input water stream and usually will contain less than 10% of the amount of sulfur contained in the input water stream. In the case where the carbon dioxide is utilized in this final step as the stripping medium, this treated water stream will contain substantial amounts of the carbonate salt of the alkaline reagent originally present in the input water stream—for example in the case where the alkaline reagent is ammonia, the treated water stream will contain ammonium-carbonate and in the case where the alkaline reagent is sodium hydroxide or carbonate the treated water stream will contain sodium carbonate.

In a preferred embodiment of the instant method, a portion of the hydrogen sulfide-containing overhead stream produced in the third step is passed to the first step in order to supply the reducing agent thereto. The remaining portion of this hydrogen sulfide-containing stream is then recovered as one of the product streams from the instant method. The hydrogen sulfide contained in this product stream can be converted to elemental sulfur by any suitable oxidation procedure such as a conventional Claus process, if desired.

Having broadly characterized the essential steps comprising the present method, reference is now made to the attached drawing for a detailed explanation of a working example of a preferred flow scheme for the present invention. The attached drawing is merely intended as a general representation of the flow scheme involved with no intention to give details about heaters, pumps, valves and the like equipment except where a knowledge of these devices is essential to an understanding of the present invention or would not be self evident to those skilled in the relevant art.

Referring now to the attached drawing, an aqueous waste stream containing ammonium sulfite in an amount of about 10 wt. percent thereof is continuously introduced into the system via line 1 and passed into the upper region of the first reaction zone, zone 2. Zone 2 is a conventional liquid-gas contacting zone designed to effect intimate contact between a downflowing liquid stream and an upflowing gas stream. Also introduced into zone 2 via line 12 is a gas stream containing hydrogen sulfide. During start-up of zone 2 sufficient $H_2S$ is introduced therein via line 14 and 12 to initiate the desired reduction reaction. Thereafter, a portion of a hydrogen sulfide-containing gas stream which is produced in a subsequently described stripping step is passed from zone 10 to zone 2 via line 12. In either case, the amount of hydrogen sulfide supplied to zone 2 is sufficient to react about 0.5 moles of hydrogen sulfide per mole of ammonium sulfite charged to this zone. By conventional means, zone 2 is maintained at a temperature of about 100° C., and a pressure of about 200 p.s.i.g., the residence time of the reactants in zone 2 is about 0.5 hours. In addition, the pH of the input water stream entering zone 2 via line 1 is maintained in the range of about 4 to about 7.

An overhead gaseous stream containing unreacted hydrogen sulfide, carbon dioxide and carbon monoxide is then withdrawn from zone 2 via line 3 and vented from the system. Additionally, an aqueous effluent stream is withdrawn from zone 2 via line 4 and charged to the second reaction zone, zone 5. This aqueous effluent stream contains ammonium thiosulfate in an amount corresponding to a conversion in zone 2 of greater than 90% of the input ammonium sulfite to ammonium thiosulfate.

Furthermore, the amount of undesired ammonium sulfate contained in this stream is less than 3% of the input ammonium sulfite. Accordingly, the aqueous effluent stream from zone 2 principally contains ammonium thiosulfate, with minor amounts of unreacted ammonium sulfite and ammonium hydroxide and with only a trace amount of ammonium sulfate.

The second reaction zone, zone 5, is another liquid-gas reaction zone designed to effect intimate contact between an ascending gas stream and a descending liquid stream. The aqueous effluent stream from zone 2 is introduced into the upper region of zone 5. Likewise, a carbon monoxide stream is introduced into the lower region of zone 5 by means of line 6. Zone 5 contains a catalyst comprising 10 to 12 mesh particles of activated carbon having a cobalt sulfide component combined therewith in an amount of about 5 wt. percent, calculated as cobalt sulfide. The amount of carbon monoxide introduced thereto via line 6 corresponds to a carbon monoxide to ammonium thiosulfate mole ratio of 5.46:1. The reduction conditions maintained in zone 5 are a temperature of 200° C., a pressure of 500 p.s.i.g., and a liquid hourly space velocity of 1 hr.$^{-1}$.

An aqueous effluent stream is then withdrawn from the lower region of zone 5 via line 8 and passed to stripping zone 10. Likewise, an overhead gaseous stream is withdrawn from the upper region of zone 5 via line 7 and passed to the lower region of stripping zone 10. An analysis of the stream flowing throughout line 8 indicates that 99% of the ammonium thiosulfate charged to zone 5 is converted to ammonium hydrosulfide. An analysis of the overhead stream withdrawn from zone 5 via line 7 indicates that it contains relatively large amounts of unreacted carbon monoxide and carbon dioxide with minor amounts of hydrogen sulfide, ammonia and water. At the junction of line 9 with line 7 additional quantities of $CO_2$ may be added in some cases to this gas stream in order to increase the efficiency of the stripping operation conditions within zone 10. In most cases the amount of $CO_2$ contained in the overhead stream from zone 5 is sufficient for the stripping step, and the addition of $CO_2$ via line 9 is not necessary.

In stripping zone 10, the aqueous effluent stream from zone 5 is countercurrently contacted with an ascending gaseous stream which essentially comprises the overhead gaseous stream from zone 5. Zone 10 is operated at a relatively low temperature and pressure as compared to zone 5. In fact excellent results are obtained at a temperature of about 70° C., and at atmospheric pressure. Once again zone 10 typically contains suitable means for effecting intimate contact between a descending water stream and an ascending gaseous stream.

An overhead gaseous stream is then withdrawn from zone 10 via line 12. It contains relatively large amounts of hydrogen sulfide, unreacted carbon monoxide, carbon dioxide and small amounts of ammonia and water. A portion of this gaseous stream is withdrawn from the system via line 13. It contains the net sulfide product of the present method, and it can be charged to any suitable process for the recovery of sulfur therefrom; for example, an indirect oxidation procedure like a conventional Claus unit. Another portion of this overhead gas stream is passed via line 12 to zone 2 in order to supply hydrogen sulfide reactant thereto. A treated water stream is also withdrawn from zone 10 via line 11. It contains substantial amounts of ammonium carbonate with minor amounts of unreacted ammonium thiosulfate, ammonium sulfite, and amonium hydrosulfide. The total sulfur content of this treated water stream is substantially less than 10% of the total sulfur content of the input water stream which enters the system via line 1. Moreover, this treated water stream contains only a trace amount of undesired ammonium sulfate. An overall sulfur balance on this system indicated that approximately 85% of the sulfur entering the process in the form of ammonium sulfite via line 1 is converted to hydrogen sulfide, while only less than about 3% of the entering sulfur is converted to undesired ammonium sulfate. These results evidence the ability of the method of the present invention to regenerate sulfite-containing water streams without producing substantial amounts of undesired ammonium sulfate by-product.

It is intended to cover by the following claims all changes and modifications of the above disclosure of the present invention which would be self-evident to a man of ordinary skill in the water treating art.

I claim as my invention:

1. A method for treating an input water stream contianing a water-soluble sulfite compound in order to reduce its total sulfur content while minimizing the formation of sulfate by-products, which comprise the steps of:
   (a) contacting the input water stream with a reducing agent selected from the group consisting of finely divided sulfur, a polysulfide compound, a water-soluble sulfide compound and mixtures thereof, at thiosulfate production conditions selected to form a thiosulfate-containing effluent stream;
   (b) reacting the effluent stream from step (a) with carbon monoxide at reduction conditions selected to produce a sulfide-containing aqueous effluent stream; and thereafter,
   (c) stripping hydrogen sulfide from the aqueous effluent stream from step (b) to form a substantially sulfate-free treated water stream which is substantially reduced in total sulfur content relative to the input water stream.

2. A method as defined in claim 1 wherein the thiosulfate production conditions utilized in step (a) includes a temperature of about 20 to about 150° C., and a pressure sufficient to maintain the input water stream in the liquid phase.

3. A method as defined in claim 1 wherein the reduction conditions utilized in step (b) include a temperature of about 125 to about 350° C. and a pressure sufficient to maintain the effluent stream from step (a) in the liquid phase.

4. A method as defined in claim 1 wherein the water-soluble sulfite compound is ammonium sulfite.

5. A method as defined in claim 1 wherein the water-soluble sulfite compound is an alkali metal sulfite.

6. A method as defined in claim 5 wherein said alkali metal sulfite is sodium sulfite.

7. A method as defined in claim 1 wherein the water-soluble sulfite compound is an alkaline earth metal sulfite.

8. A method as defined in claim 7 wherein the alkaline earth sulfite is magnesium sulfite.

9. A method as defined in claim 1 wherein the amount of carbon monoxide charged to step (b) is sufficient to provide a mole ratio of carbon monoxide to thiosulfate of at least 4:1.

10. A method as defined in claim 1 wherein the reducing agent utilized in step (a) is hydrogen sulfide.

11. A method as defined in claim 10 wherein at least a portion of the hydrogen sulfide utilized in step (a) is obtained by passing thereto a portion of the hydrogen sulfide stripped in step (c).

12. A method as defined in claim 1 wherein the reducing agent utilized in step (a) is finely divided sulfur which is used in an amount at least sufficient to provide a mole ratio of sulfur to sulfite of 1:1.

13. A method as defined in claim 1 wherein the reducing agent utilized in step (a) is a polysulfide compound which is used in an amount at least sufficient to provide a mole ratio of polysulfide to sulfite of 1:6.

14. A method as defined in claim 1 wherein the reducing agent utilized in step (a) is a water-soluble sulfide compound which is used in an amount at least sufficient to provide a mole ratio of sulfide to sulfite of 1:2.

15. A method as defined in claim 1 wherein the input water stream contains about 0.1 to about 25 wt. percent of the water-soluble sulfite compound.

16. A method as defined in claim 1 wherein step (b) is performed in the presence of a catalyst comprising activated carbon.

17. A method as defined in claim 1 wherein step (b) is performed in the presence of a catalyst comprising a combination of a metallic component selected from the group consisting of the transition metals of Group VI and VII with a porous carrier material.

18. A method as defined in claim 17 wherein the catalyst is cobalt sulfide combined with activated carbon.

19. A method for treating an input water stream containing ammonium sulfite in order to reduce its total sulfur content while minimizing the formation of ammonium sulfate, which comprises the steps of:
 (a) contacting the input water stream with hydrogen sulfide at thiosulfate production conditions selected to form an effluent stream containing ammonium thiosulfate;
 (b) reacting the effluent stream from step (a) with carbon monoxide at reduction conditions selected to produce an aqueous effluent stream containing ammonium hydrosulfide;
 (c) contacting the aqueous effluent stream from step (b) with a gas stream containing carbon dioxide at conditions selected to form a hydrogen sulfide-containing overhead stream and a treated water stream containing ammonium carbonate, which water stream is substantially reduced in total sulfur content relative to the input water stream and is substantially free of ammonium sulfate; and
 (d) passing a portion of the overhead stream formed in step (c) to step (a) in order to suply hydrogen sulfide reactant thereto.

20. A method as defined in claim 19 wherein step (b) is performed in the presence of a catalyst comprising a metallic sulfide, which is selected from the group consisting of cobalt, molybdenum and tungsten sulfide, combined with an activated carbon carrier material.

21. A method as defined in claim 19 wherein step (b) is performed in the presence of a catalyst comprising activated carbon.

References Cited
UNITED STATES PATENTS

| | | | |
|---|---|---|---|
| 2,863,732 | 12/1958 | Bowers et al. | 210—53X |
| 3,511,027 | 5/1970 | Roberts et al. | 55—51X |

MICHAEL ROGERS, Primary Examiner

U.S. Cl. X.R.

23—2